United States Patent [19]

Sakai et al.

[11] Patent Number: 4,716,576
[45] Date of Patent: Dec. 29, 1987

[54] APPARATUS FOR CONTROLLING TRANSMITTER-RECEIVER

[75] Inventors: Shigeru Sakai; Kazunori Kudo, both of Tokyo, Japan

[73] Assignee: Kabushiki Kaisha Kenwood, Japan

[21] Appl. No.: 631,074

[22] Filed: Jul. 16, 1984

[30] Foreign Application Priority Data

Jul. 20, 1983 [JP] Japan .................. 58-111555[U]

[51] Int. Cl.⁴ ............................................. H04B 1/40
[52] U.S. Cl. .................................... 375/5; 375/8; 455/31; 455/79
[58] Field of Search .................. 375/5, 7, 8, 104; 340/825.06; 455/35, 58, 73, 78, 218, 225, 227, 228, 232, 31, 79; 179/2 DP, 2 EA, 3, 84 R, 84 VF; 370/111; 379/63, 94, 97

[56] References Cited

U.S. PATENT DOCUMENTS

| | | | |
|---|---|---|---|
| 1,940,881 | 12/1933 | Ports | 375/7 |
| 3,311,704 | 3/1967 | Filipowsky et al. | 179/2 DP |
| 3,486,119 | 12/1969 | Shimada | 455/31 |
| 3,517,137 | 6/1970 | Ribner | 179/2 DP |
| 3,823,375 | 7/1974 | Wycoff | 455/31 |
| 3,909,727 | 9/1975 | Hughes et al. | 375/5 |
| 4,020,421 | 4/1977 | Elder et al. | 375/5 |
| 4,131,849 | 12/1978 | Freeburg et al. | 375/5 |
| 4,271,499 | 6/1981 | Leveque | 370/111 |
| 4,352,201 | 9/1982 | Miller | 455/58 |
| 4,384,356 | 5/1983 | Beerbaum | 375/8 |
| 4,430,742 | 2/1984 | Milleker et al. | 375/5 |
| 4,431,991 | 2/1984 | Bailey et al. | 375/5 |

Primary Examiner—Benedict V. Safourek
Attorney, Agent, or Firm—Gerald J. Ferguson, Jr.; Michael P. Hoffman; Michael J. Foycik, Jr.

[57] ABSTRACT

An apparatus for controlling a transmitter-receiver which can transmit and receive an aural signal and a data signal. In the transmission mode, the control apparatus detects a data transmission instruction of the transmitter-receiver and changes to the mode in that the data signal is supplied to the transmission unit of the transmitter, thereby executing the data transmission. On the other hand, in the reception mode, the control apparatus discriminates that the signal received is the transmission data to the transmitter-receiver and reduces the output volume of the receiving unit, thereby allowing the transmitter-receiver to receive the reception signal as the data signal.

5 Claims, 5 Drawing Figures

DATA FORMAT

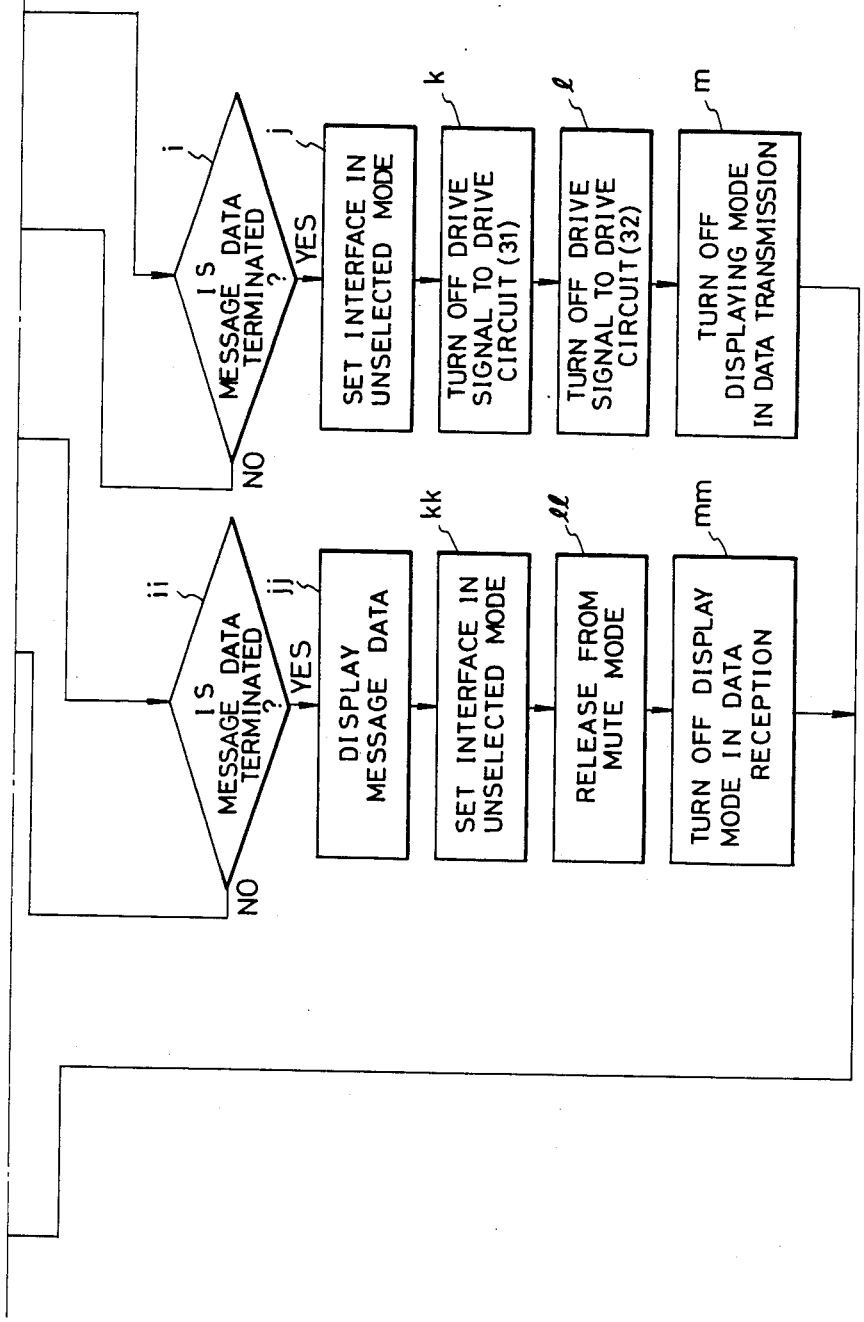

APPARATUS FOR CONTROLLING TRANSMITTER-RECEIVER

BACKGROUND OF THE INVENTION

1. Field of the Invention

The present invention relates to an apparatus for controlling a transmitter-receiver which can easily perform the data communication by being equipped in a transmitter-receiver.

2. Description of the Prior Art

In case of performing the data communication by a transmitter-receiver which is used for an amateur radio or the like, various problems are caused since the transmitter-receiver is not designed in consideration of the data communication. For example, in case of the data reception, it is necessary to discriminate the signal received to see if it is the conventional aural information or data information and to perform the data processing only when it is the data information. In addition, it is necessary to disconnect the microphone output from the transmission unit of the transmitter-receiver only in case of the data transmission and to set the transmission unit of the transmitter-receiver into the transmitting state synchronously with the start of data transmission, and the like. However, it is impossible to manually perform these operations and the operation to execute the data communication by use of the conventional transmitter-receiver is complicated.

SUMMARY OF THE INVENTION

It is an object of the present invention to solve the above-mentioned problems and to provide an apparatus for controlling the transmitter-receiver which can automatically switch the transmission and reception of the aural signal and the data signal without requiring the manual operation.

To accomplish the above-mentioned function, the apparatus for controlling a transmitter-receiver according to the present invention detects a data transmission instruction of the transmitter-receiver and switches so as to output a data signal; on the other hand, the apparatus discriminates that the signal received is the transmission data to the transmitter-receiver, thereby reducing the output volume of the receiving unit of the transmitter-receiver, and at the same time it allows the transmitter-receiver to receive that reception signal as the data signal.

BRIEF DESCRIPTION OF THE DRAWINGS

FIGS. 3A and 3B are flow charts explaining the operation of one embodiment of the invention.

DETAILED DESCRIPTION OF THE EMBODIMENT

Figure 1:
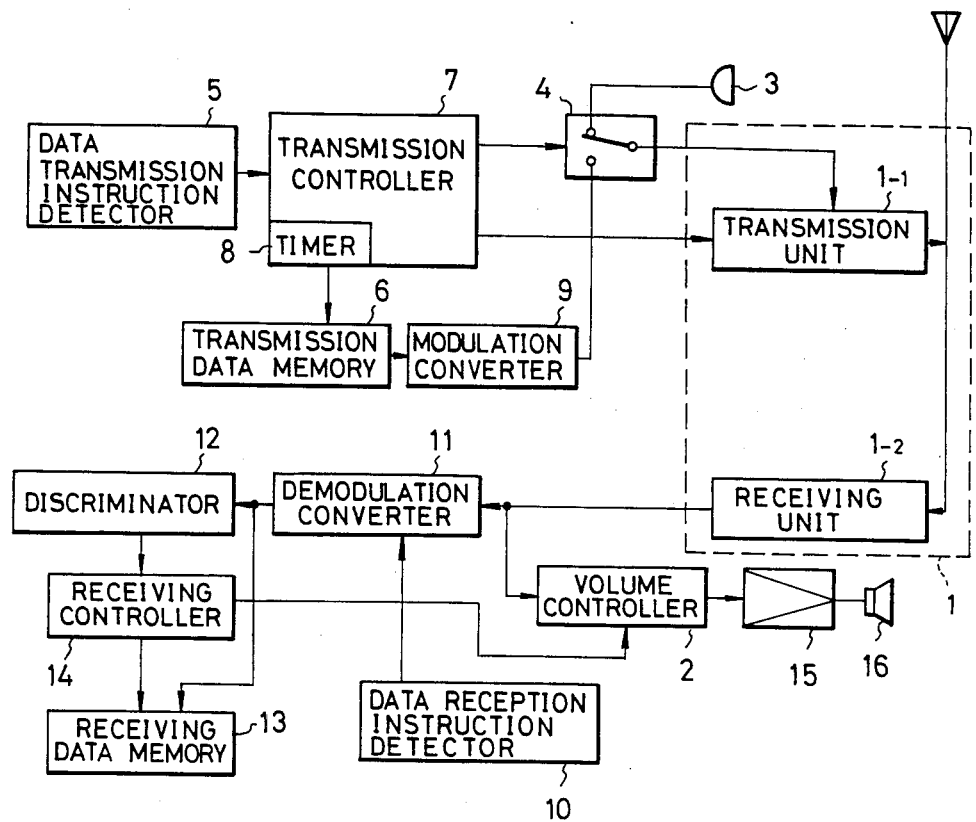
FIG. 1 is a functional block diagram of the present invention.

The present invention will now be described hereinbelow with respect to a functional block diagram of this invention shown in FIG. 1.

A reference numeral 1 denotes a transmitter-receiver which is controlled by an apparatus for controlling a transmitter-receiver according to the present invention. This transmitter-receiver comprises a transmission unit 1-1 and a receiving unit 1-2. A low-frequency amplifier 15 and a speaker 16 operate cooperatively with the receiving unit 1-2. The low-frequency amplifier 15 amplifies the low-frequency output which is output from the main body of the receiving unit 1-2 and is supplied through a volume controller 2 such as muting means or the like, thereby driving the speaker 16. A numeral 3 indicates a microphone and an output from the microphone 3 is supplied to the transmission unit 1-1 through a change-over switch 4 which will be explained later. In addition, the low-frequency amplifier 15 and the speaker 16 may be built in the receiving unit 1-2.

On the other hand, the apparatus for controlling a transmitter-receiver comprises: a data transmission instruction detector 5 to detect the data transmission instruction; a transmission data memory 6 to store the message data and the discrimination code data which is transmitted prior to that message data and is used to discriminate the message data from the transmission data from another transmitter-receiver and to discriminate the message data from the aural signal; a transmission controller 7 which receives an output of the data transmission instruction detector 5 and switches the change-over switch 4 from the side of the microphone 3 to a modulation converter 9 which will be explained later right after the transmission was instructed, and which controls the transmission unit 1-1 into the operating state and gives an address instruction to the transmission data memory 6 from the time when the set time of a timer 8 has passed from the time of the transmission instruction; and the modulation converter 9 which converts the transmission data read out from the transmission data memory 6 to the serial data and modulates it and supplies the modulation output to the change-over switch 4.

Further, the apparatus for controlling a transmitter-receiver also comprises: a data reception instruction detector 10 to detect the data reception instruction; a demodulation converter 11 which receives the low-frequency output supplied from the receiving unit 1-2 to the volume controller 2 when there is a data reception instruction detection output and which demodulates it and then converts it to the parallel data; a discriminator 12 which receives the parallel data from the demodulation converter 11 and which discriminates that this parallel data is the transmission data and is the data for the relevant transmitter-receiver; a receiving data memory 13; and a receiving controller 14 which outputs a volume reduction instruction signal to the volume controller 2 and also outputs an write address to the receiving data memory 13, thereby sequentially writing the output of the demodulation converter 11 when it was discriminated by the discriminator 12 that the low-frequency output from the receiving unit 1-2 is the data and is the data for the relevant transmitter-receiver.

When the data transmission was instructed, it is detected by the data transmission instruction detector 5, so that the output of the microphone 3 is disconnected from the transmission unit 1-1 by the transmission controller 7 and at the same time the transmission unit 1-1 is controlled into the operating state. From the time when the set time period of the timer 8 has passed after the transmission instruction detector 5 had generated the detection output, the data stored in the transmission data memory 6 is sequentially read out from the transmission controller 7 and is converted to the serial data. Thereafter, it is modulated and is supplied to the transmission unit 1-1 through the change-over switch 4 and is transmitted. Since the transmission unit 1-1 is in the warm-up state for the set time period by the timer 8 when this transmission is started, the transmission can be immediately performed. Thus, the message data is transmitted from the transmission unit 1-1 subsequently to the transmission of the discrimination code data. On the other hand, when the data transmission is not instructed, the change-over switch 4 has been switched to the side of the microphone 3, so that the aural signal output from the microphone 3 is transmitted through the transmission unit 1-1.

On the other hand, when the data reception was instructed, it is detected by the data reception instruction detector 10, so that the low-frequency signal output from the receiving unit 1-2 is demodulated by the demodulation converter 11 and the demodulation output is converted to the parallel data. This parallel data converted is discriminated by the discriminator 12 to see if it is the aural signal or the transmission data. When the parallel data was determined to be the transmission data, it is further discriminated to see if it is the transmission data for the relevant transmitter-receiver or not. This discrimination is performed using the discrimination code data in the parallel data converted. When the parallel data was determined by the discriminator 12 that it is the transmission data and is the data for the relevant transmitter-receiver, the receiving controller 14 reduces the volume through the volume controller 2. This reduction in volume makes the reproduction volume of the transmission data which is generated from the speaker 16 decrease. The receiving controller 14 controls the volume and also gives the address instruction to the receiving data memory 13. The message data converted by the demodulation converter 11 is stored in the receiving data memory 13. On the contrary, when the parallel data was determined that it is not the transmission data, the volume controller 2 is not driven. Thus, the low-frequency output from the receiving unit 1-2 is supplied to the low-frequency amplifier 15 and is reproduced by the speaker 16 without being attenuated.

When the discriminator 12 discriminated that the conversion data output from the demodulation converter 11 was the transmission data, the volume may be reduced by driving the volume controller 2.

In addition, instead of independently instructing the data reception, the data reception may be instructed by giving the reception instruction to the receiving unit 1-2.

Figure 2:
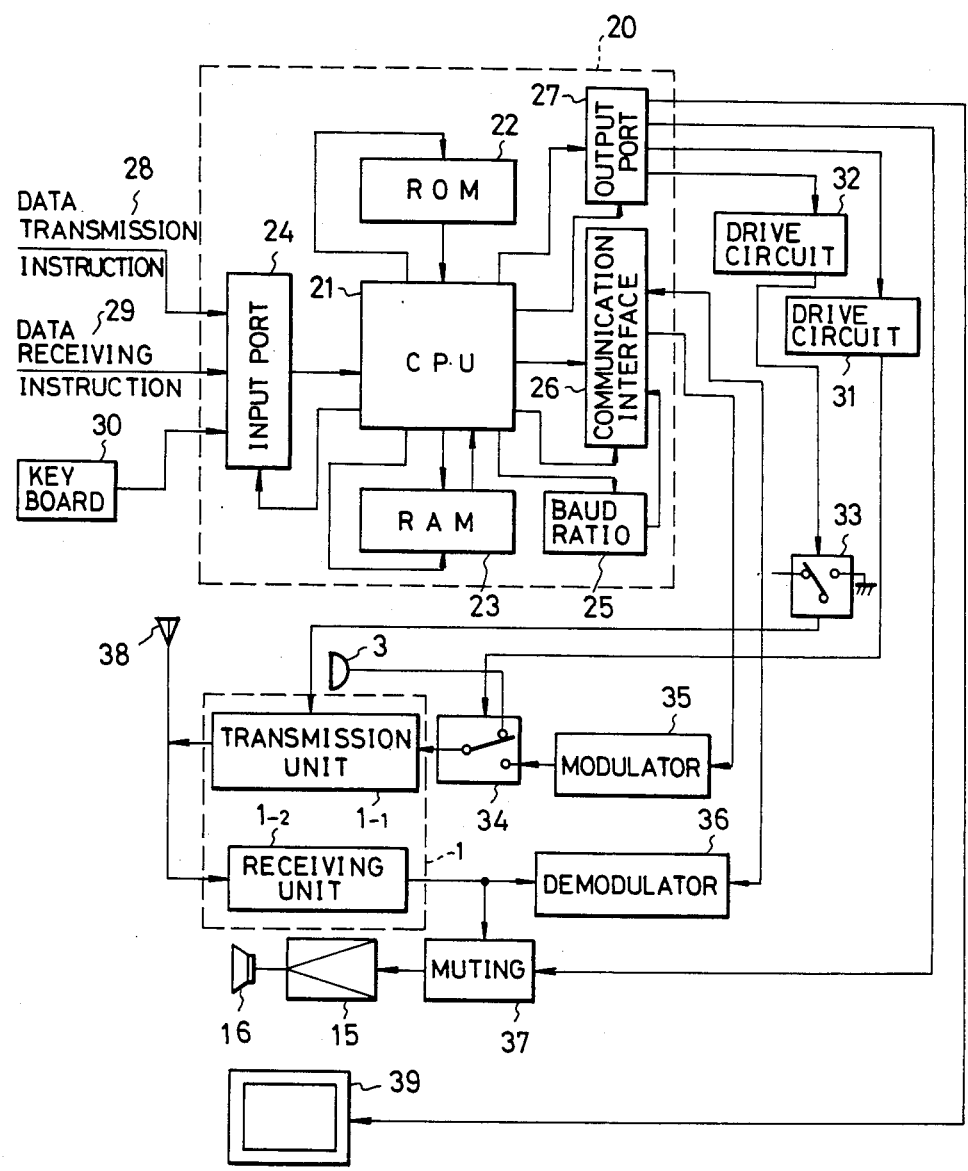
FIG. 2 is a block diagram showing an arrangement of one embodiment of the invention.

A practical example of the present invention will then be described with respect to one embodiment shown in FIG. 2.

A numeral 1-1 indicates the transmission unit of the transmitter-receiver 1 and a so-called standby switch is provided in the transmission unit 1-1 in order to set the transmission unit into the operating state prior to the transmission and to warm it up as in the conventional one. A preparation control switch 33 is connected in parallel to the standby switch. The preparation control switch 33 is driven by an output of a drive circuit 32 which will be explained later. The aural signal from the microphone 3 and the modulated signal from a modulator 35 are supplied to a change-over switch 34 corresponding to the change-over switch 4. Either one of those signals is selected by the change-over switch 34 and is supplied to the transmission unit 1-1 as the signal which is transmitted. The change-over switch 34 is driven in response to an output of a drive circuit 31 which will be explained later.

A numeral 1-2 represents the receiving unit of the transmitter-receiver. The low-frequency signal output from the receiving unit 1-2 is supplied to a demodulator 36 and is also supplied to the low-frequency amplifier 15 through a muting circuit 37 corresponding to the volume control 2.

In addition, a numeral 38 is an antenna of the transmitter-receiver 1.

A microcomputer 20 fundamentally comprises: a CPU 21; an ROM 22; an RAM 23 including the transmission data memory 6 and the receiving data memory 13; an input port 24; a programmable baud ratio generator 25; an interface circuit 26 for the asynchronous serial communication; and an output port 27. An output of a data transmission instruction switch 28 to instruct the data transmission, an output of a data receiving instruction switch 29 to instruct the data reception, and an output of a keyboard switch 30 are supplied to the input port 24. Programs to control the CPU 21 have been written in the ROM 22. The CPU 21 reads the output of the data transmission instruction switch 28, the output of the data receiving instruction switch 29, and the output of the keyboard switch 30 through the input port 24 in accordance with the programs written in the ROM 22 if necessary. These outputs are stored in the RAM 23 or register. There are performed the processings such as the transmission and reception, discrimination, arithmetic operation, and comparison of the storage data, the setting of the oscillating frequency of the baud ratio generator 25, the control of the interface circuit 26, and the like. Through the output port 27, drive signals are output to the drive circuits 31 and 32, a muting control signal to drive the muting circuit 37 is output thereto, and display data is output to a CRT display unit 39, respectively, in accordance with those processings in dependence upon the necessity. The demodulated signal from the demodulator 36 is read through the interface circuit 26 in accordance with the necessity. The serial transmission data is output through the interface circuit 26 to the modulator 35 as the modulation signal in accordance with the necessity.

The data transmission instruction switch 28 and the data receiving instruction switch 29 are the change-over switches in which, for example, one contact is connected to a power source +B through a pull-up resistor and the other contact is grounded and in which an output of the movable member is supplied to the input port 24. In addition, in place of the change-over switches, outputs from a plurality of particular key switches of the keyboard 30 may be used as the instruction for data transmission and the instruction for data reception, respectively. Also, in place of the data receiving instruction switch 29, the output of the receiving instruction switch to set the receiving unit 1-2 of the transmitter-receiver 1 into the receiving state may be supplied to the input port 24. In this case, the receiving instruction of the transmission data is not particularly distinguished but the output of the receiving instruction switch of the receiving unit 1-2 becomes the data receiving instruction signal.

Figure 3A:
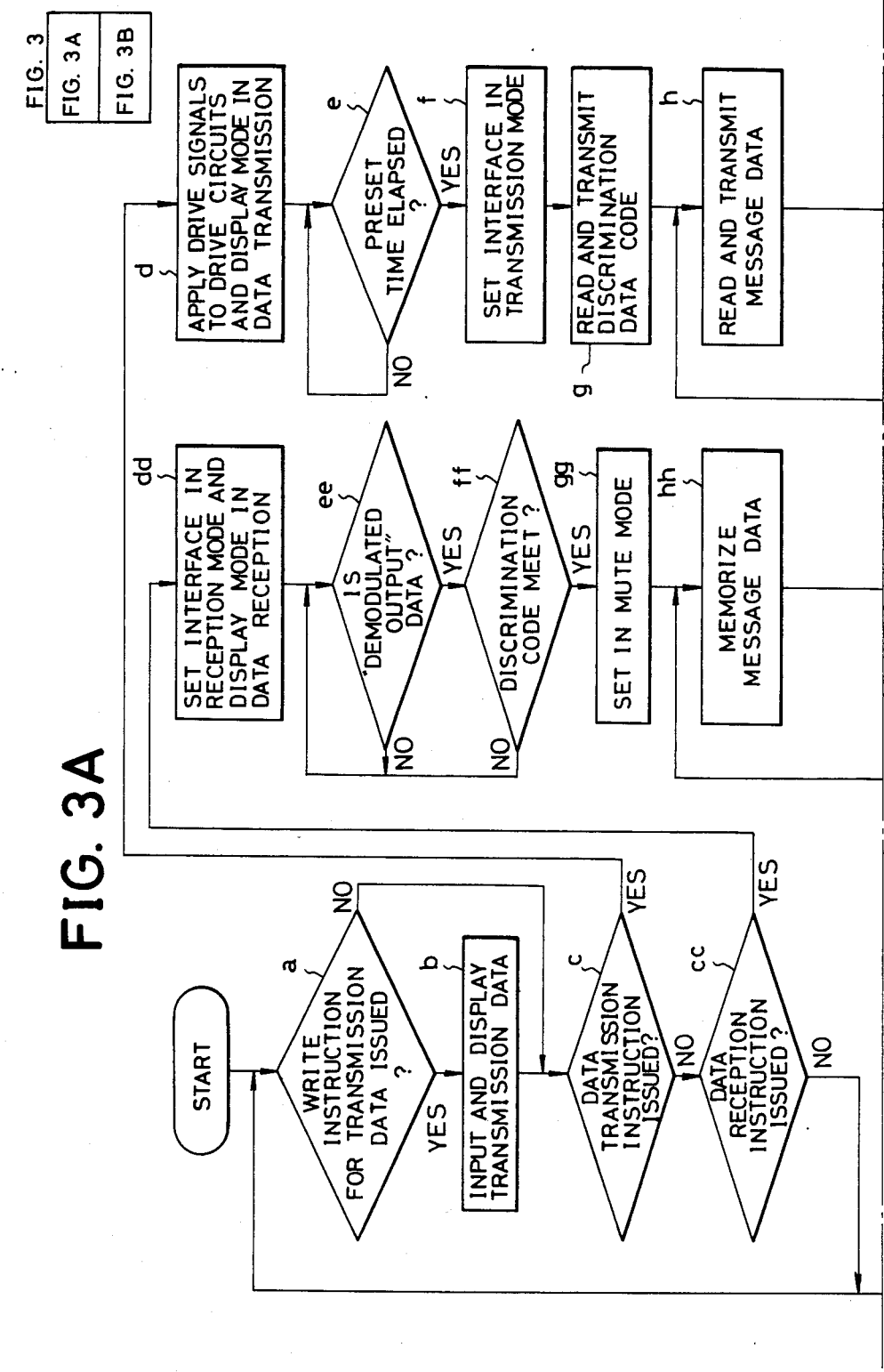

The operations of one embodiment of the present invention constituted as described above will then be explained in conjunction with the flow chart shown in FIG. 3.

Figure 4:
FIG. 4 is an explanatory diagram showing a format of the transmission and reception data.

When the programs written in the ROM 22 are made operative, the write instruction for transmission data is checked to see if it was issued or not from the keyboard switch 30 (step a). When the write instruction for transmission data was issued, subsequently to step a, the instruction is issued to sequentially write the transmission data which were sequentially input from the keyboard switch 30 into the transmission data memory areas provided in the RAM 23 and to store them therein, and at the same time they are output to the CRT display unit 39 and are displayed thereon (step b). An example of format of the transmission data is shown in FIG. 4. In FIG. 4, A indicates a discrimination data section to distinguish the aural signal from the transmission data and is constituted by "0" of 24 bytes. This is because when the aural signal was received, it is considered that the output of the demodulator 36 doesn't continue the output of "0" for 24 bytes. As will be explained later, in case of the reception, when "0" continued for 17 bytes, it is determined that the data was received. B indicates a discrimination code section to discriminate in the reception mode that the transmission data is the data which was sent from the transmitter-receiver. This section B is set to the data which was predetermined in the transmission mode and the reception mode prior to the data transmission. C represents a synchronous data section and is constituted by the data of "6", "5", ..., "0" and indicates the start position of the message data. D denotes a message data section. Although the number of characters in the message data section D might have been predetermined, a stop bit of one character and a message data stop bit which can be discriminated may be added to the last portion of the message data. In addition, in the execution of the processing in step b, it is also possible to preliminarily memorize the sections other than the discriminating code section B and the message data section D into the ROM 22 and to transfer them to the RAM 23 and write them therein in step b and to directly read the data from the ROM 22 at the time of data transmission.

Subsequently to the execution of the processing in step b, the state of the data transmission instruction switch 28 is read and the instruction for data transmission is checked to see if it was issued or not (step c). In the case where it is determined that the write instruction for transmission data is not issued in step a, the processing in step c is executed subsequently to step a. When the data transmission instruction was detected in step c, the drive signals are supplied to the drive circuits 31 and 32, then the character data in the data transmission is supplied to the CRT display unit 39 (step d). After the drive circuits 31 and 32 received the drive signals, they respectively switch the change-over switch 34 from the microphone side to the side of the modulator 35 and the standby control switch 33 to the driving side of the transmission unit 1-$_1$. Therefore, the transmission unit 1-$_1$ becomes the warm-up state, so that the modulated signal from the modulator 35 becomes the transmittable state after the preset time elapsed. In addition, the indication in data transmission is displayed on the CRT display unit 39.

After step d, the soft timer routine which has been programmed in the ROM 22 is executed and the time preset by the soft timer routine is checked to see if it elapsed or not (step e). In addition, it is also possible to equip a hard timer in the microcomputer 20 and to wait for the elapse of the preset time in place of the soft timer routine. When it was determined in step e that the preset time elapsed, the interface circuit 26 is selected and is set into the transmission mode, and at the same time it is set to the baud ratio which was preset together with the reception side (step f). After step f, as shown in FIG. 4, the data of the discrimination data section (A), discrimination code section (B) and synchronous data section (C) are sequentially read out and are converted to the serial data. Then, they are sequentially sent to the modulator 35 at the preset baud ratio (step g). When the processing in step f is executed after the preset time elapsed in step e, the warm-up state of the transmission unit 1-$_1$ is finished and is in the transmittable state.

Subsequently to step g, the data of the message data section (D) is sequentially read out and is converted to the serial data, thereafter the serial data is sent to the modulator 35 (step h). After step h, the data of the message data section (D) is checked to see if it was all sent or not. The processings in steps h and i are repeated until the data of the message data section (D) is all terminated, and when the data of the message data section (D) was all terminated, the processings advance from the loop of steps h and i (step i). The detection in step i is performed in the manner such that in the case where the number of character data of the message data section (D) has been preset, the detection is made by the fact that the number of data which was read out reaches the preset number; on the other hand, in the case where the message data stop bit has been added to the message data section (D), the detection is made by detecting this stop bit.

The transmission data transmitted in steps g and h are subjected to predetermined modulation by the modulator 35, e.g., to the modulation of the frequency shift keying method. The modulated signal from the modulator 35 is supplied to the transmission unit 1-$_1$ in place of the aural signal from the microphone 3 and is transmitted by the transmission unit 1-$_1$.

When it was determined in step i that all of the message data (D) was read out, the interface circuit 26 is set into the unselected mode (step j) after step i and the drive signal to the drive circuit 31 is turned off (step k). The control for the change-over switch 34 by the drive circuit 31 is released since the drive signal was turned off, so that the change-over switch 34 switches the aural signal from the microphone 3 to the state in that it is sent to the transmission unit 1-$_1$. Subsequently to step k, the drive signal to the drive circuit 32 is turned off (step l). Since the drive signal was turned off, the control signal for the standby control switch 33 from the drive circuit 32 is turned off and the standby control switch 33 is returned to the original state, so that the transmission unit 1-$_1$ is set into the non-transmission mode. After step l, the indication in data transmission on the CRT display unit 39 is turned off (step m), and then the processing is returend to execution of step a.

On the other hand, when the data transmission instruction is not detected in step c, subsequently to step c, the mode of the data reception instruction switch 29 is read to see if the data reception instruction was issued or not (step cc). When it was determined in step cc that the data reception instruction was issued, the interface circuit 26 is set into the reception mode and at the same time the baud ratio which was preset together with the transmission side is set. Then, the character data in data reception is sent to the CRT display unit 39 and the demodulated output which is output from the demodulator 36 is converted to the parallel data and is sequentially read (step dd). The demodulated output which was read in step dd is checked to see if at least 17 bytes in such demodulated output continue "0" or not, and the information transmitted by the demodulated output is checked to see if it is the data information or the aural signal (step ee). When at least the 17 bytes continued "0", it is determined that the demodulated output is the data information. This is because in case of the aural signal, "0" will not continue for 17 bytes and although the transmission side sends "0" for 24 bytes, there is a case where the data reception instruction is delayed. When the demodulated output was determined to be the data in step ee, this data is subsequently checked to see if it is the transmission data for the transmitter-receiver or not by use of the data input as the discrimination code (step ff). This detection in step ff is performed by, for example, comparing the data of the discrimination code section (B) which was written in the RAM 23 at the time of data transmission with the data of the discrimination code of the data received. When it was determined that the demodulated output is not the data and that the discrimination code is not the transmission data for the transmitter-receiver in steps ee and ff, the loop of steps ee and ff is repeated and the apparatus waits until the transmission data to the transmitter-receiver is received. When it was determined that the demodulated output is the transmission data to the transmitter-receiver in step ff, the mute control signal is supplied to the muting circuit 37 (step gg). After the mute control signal was supplied to the muting circuit 37, this circuit mutes the low-frequency output which was output from the receiving unit 1-2 and turns off the input to the low-frequency amplifier 15. Thus, the speaker 16 is not driven and the sound corresponding to the transmission data is not generated.

Subsequently to step gg, it is detected that the data read decreases to "6", "5", ... "0" and the data subsequent to "0" is determined to be the message data, so that the message data is read in the reception data memory areas of the RAM 23 and is memorized therein (step hh). After step hh, it is checked to see if all of the message data was read or not, and the processing in step hh is repeated until the message data is all read (step ii). When the message data was all terminated, the message data stored in the reception data memory areas of the RAM 23 is sent to the CRT display unit 39 and is displayed on the CRT display unit 39 (step jj). After step jj, the interface circuit 26 is set into the unselected mode (step kk), then the mute control signal to the muting circuit 37 is turned off (step ll). Therefore, the muting operation of the muting circuit 37 is cancelled. Subsequently to step ll, the indication in reception mode on the CRT display unit 39 is released (step mm) and the processing is returned to step a.

When it is discriminated that the data reception instruction is not issued in step cc, the processing in step a is executed after step cc.

On the other hand, when the data transmission instruction and the data reception instruction are not issued, the standby control switch 33 is not made operative but the change-over switch 34 has been switched to the microphone side. Therefore, the muting circuit 37 doesn't perform the muting operation, so that the low-frequency output from the receiving unit 1-2 is directly supplied to the low-frequency amplifier 15. Thus, this enables the apparatus to operate as the ordinary transmitter-receiver in this state.

Further, in the above-described embodiment of the present invention, it is possible to connect the baud ratio generator 25, interface circuit 26, drive circuits 31 and 32, standby control switch 33, change-over switch 34, modulator 35, demodulator 36, and muting circuit 37 to a personal computer of which portions of the bus line and output port were extended.

What is claimed is:

1. A transmitter-receiver which transmits or receives an aural signal or a data signal, comprising:
   a transmitting unit (e.g. 1-1);
   a receiving unit (e.g. 1-2);
   a speaker (e.g. 16) for transducing an electrical signal received in said receiving unit into an acoustic sound;
   a discriminator (e.g. 12) for discriminating whether an aural signal or a data signal is present in the electrical signal received in said receiving unit;
   a volume controller (e.g. 2) in response to said discriminator detecting a data signal in the received signal for reducing the electrical signal applied to said speaker and thus reduce the volume of the data signal generated from the speaker, and
   wherein said volume controller reduces the electrical signal to a level at which an operator can hear the acoustic sound from said speaker in response to said discriminator detecting said data signal so that the received data signal can be monitored as the acoustic sound from the speaker.

2. A transmitter-receiver according to claim 1 further comprising:
   a memory (e.g. 13) for storing the receiving data signal; and
   a receiving controller (e.g. 14) in response to said discriminator detecting said data signal for directing said memory to store the received data signal.

3. A transmitter-receiver according to claim 1, wherein said discriminator further discriminates the data signal as to whether the received data signal is intended for said transmitter-receiver.

4. A transmitter-receiver which transmits or receives an aural signal or a data signal, comprising:
   a microphone (e.g. 3) for generating the aural signal to be transmitted;
   a memory (e.g. 6) for storing the data signal to be transmitted;
   means for generating a data signal transmission instruction;
   a transmitting unit (e.g. 1-1);
   a receiving unit (e.g. 1-2)
   a switch (e.g. 4) for selectively connecting the outputs of said microphone or said memory to said transmitting unit; and
   a controller (e.g. 7) in response to said data signal transmission instruction for controlling said switch to connect the output of said memory to said transmitting unit and for initiating the read-out of said data signal from said memory after a predetermined time lapse from the response of the controller to the data signal transmission instruction, and wherein said predetermined time lapse corresponds to warm-up time of said transmitting unit.

5. A transmitter-receiver according to claim 4, wherein said controller includes a timer (e.g. 8) for setting said predetermined time lapse.

* * * * *